(12) United States Patent
Sanchez et al.

(10) Patent No.: US 11,479,014 B2
(45) Date of Patent: Oct. 25, 2022

(54) MOTOR VEHICLE SEAT CUSHION

(71) Applicant: TESCA FRANCE, Paris (FR)

(72) Inventors: Santiago Sanchez, Paris (FR); Lluis Puig, Paris (FR)

(73) Assignee: TESCA France, Paris (FR)

( * ) Notice: Subject to any disclaimer, the term of this patent is extended or adjusted under 35 U.S.C. 154(b) by 87 days.

(21) Appl. No.: 16/631,076

(22) PCT Filed: Jul. 25, 2018

(86) PCT No.: PCT/FR2018/051909
§ 371 (c)(1),
(2) Date: Jan. 14, 2020

(87) PCT Pub. No.: WO2019/020942
PCT Pub. Date: Jan. 31, 2019

(65) Prior Publication Data
US 2020/0147926 A1 May 14, 2020

(30) Foreign Application Priority Data
Jul. 28, 2017 (FR) ...................................... 1757241

(51) Int. Cl.
*B32B 5/18* (2006.01)
*B32B 5/24* (2006.01)
(Continued)

(52) U.S. Cl.
CPC ................ *B32B 5/18* (2013.01); *B32B 5/245* (2013.01); *B60N 2/5678* (2013.01);
(Continued)

(58) Field of Classification Search
CPC ....... B32B 5/18; B32B 5/245; B32B 2255/02; B32B 2264/1051; B60N 2/5678; B60N 2/5685; B60N 2/5891
See application file for complete search history.

(56) References Cited

U.S. PATENT DOCUMENTS 6,738,265 B1 * 5/2004 Svarfvar .................. D04C 1/06
361/818
2004/0256904 A1 * 12/2004 Takei .................. B29C 44/1209
297/452.48

(Continued)

FOREIGN PATENT DOCUMENTS

| EP | 2842798 A1 | 3/2015 |
| WO | 02074016 A1 | 9/2002 |
| WO | 2013050621 A2 | 4/2013 |

OTHER PUBLICATIONS

International Search Report issued in corresponding application No. PCT/FR2018/051909 dated Oct. 22, 2018.

*Primary Examiner* — Hai Vo
(74) *Attorney, Agent, or Firm* — Murtha Cullina LLP

(57) ABSTRACT

The invention concerns a cushion or cushioning comprising, a cover an outer covering layer, a middle foam layer and an inner mesh layer. The cushion also includes an electric circuit connected to an electric generator, the circuit being made from conductive ink deposited on a support layer. The circuit extends opposite the complex; a block of elastically compressible padding, the support layer being formed either by the inner layer, or by an additional mesh layer interposed between the inner layer and the block.

8 Claims, 1 Drawing Sheet

(51) Int. Cl.
*B60N 2/58* (2006.01)
*B60N 2/56* (2006.01)
*B29L 31/58* (2006.01)

(52) U.S. Cl.
CPC ........ *B60N 2/5883* (2013.01); *B29L 2031/58* (2013.01); *B32B 2255/02* (2013.01); *B32B 2255/26* (2013.01); *B32B 2262/0261* (2013.01); *B32B 2262/0276* (2013.01); *B32B 2264/1051* (2020.08); *B32B 2266/0278* (2013.01); *B32B 2307/72* (2013.01); *B32B 2605/003* (2013.01); *B60N 2/5685* (2013.01); *B60N 2/5891* (2013.01)

(56) References Cited

U.S. PATENT DOCUMENTS

| | | | | |
|---|---|---|---|---|
| 2010/0140564 | A1* | 6/2010 | Overbreek | H01B 1/22 252/514 |
| 2013/0038108 | A1* | 2/2013 | Hayakawa | B60N 2/3011 297/332 |
| 2015/0054317 | A1* | 2/2015 | Fortune | B60N 2/002 297/180.12 |
| 2016/0052432 | A1 | 2/2016 | Lafferty et al. | |
| 2019/0283628 | A1* | 9/2019 | Sanchez | B60N 2/002 |

* cited by examiner

MOTOR VEHICLE SEAT CUSHION

CROSS-REFERENCE TO RELATED APPLICATIONS

This application claims the benefit of International application number PCT/FR2018/051909, filed Jul. 25, 2018 and French application number 1757241, filed Jul. 28, 2017 the entire contents of which are incorporated herein by reference.

TECHNICAL FIELD

The invention relates to a cushioning or cushion for a motor vehicle seat and a seat provided with such a cushioning or cushion.

BACKGROUND

It is known to produce a cushioning or cushion for a motor vehicle seat, the cushioning or cushion comprising consecutively:
a cover for lining the block, the cover being comprised of a plurality of formats associated with each other, at least one of the formats being in the form of a complex comprising, associated with each other, in sequence:
an outer covering layer,
a middle foam layer,
an inner mesh layer,
an electric circuit intended to be connected to an electric generator, the circuit being made from conductive ink deposited on a support layer, the circuit extending opposite the complex,
a block of elastically compressible padding.

In the embodiments of prior art, the cushions thus defined can have at least one of the following disadvantages:
the presence of the support layer—for example in the form of a thermoplastic film or non-woven—can contribute to stiffening the cushioning or cushion and therefore to altering the sinking comfort thereof,
the support layer, when it is sealed, as it is the case for a thermoplastic film, is detrimental to the hygrothermal comfort of the cushioning or cushion,
the support layer can, in particular when it is in a non-woven form, substantially absorb the ink in the thickness thereof, via the "blotting" effect, which can be detrimental to the characteristics of the electric circuit.

The invention has for purpose to overcome these disadvantages.

To this effect, and according to a first aspect, the invention proposes a cushioning or cushion for a motor vehicle seat, the cushioning or cushion comprising consecutively:
a cover for lining the block, the cover being comprised of a plurality of formats associated with each other, at least one of the formats being in the form of a complex comprising, an electric circuit intended to be connected to an electric generator, the circuit being made from conductive ink deposited on a support layer, the circuit extending opposite the complex,
a block of elastically compressible padding,
the support layer being formed:
either by the inner layer,
or by an additional mesh layer interposed between the inner layer and the block.

Recall here (in reference to the work "Le dictionnaire des textiles—Maggy Baum and Chantal Boyeldieu—les editions de l'industrie textile—2002) the definition of a mesh:

"Constituent and fundamental element of a textile surface that comprises a more or less loose network of intertwined yarns of a yarn loop passing through another. Basic unit of textiles fashioned in knitting, crochet, lace, wave, netting. Each mesh encloses one or several yarn loops joined in different ways to one another according to the technique used. By modifying the characteristics of the mesh, new patterns, other reliefs are obtained or created. Parts of the mesh: any mesh is comprised of:
a head: upper portion forming the half-circle of the needle loop;
two wings or legs: narrow portions of the mesh (lateral portions) that connect the head and the feet;
two feet: curved lower portion of the mesh."
Note: These various portions are shown in FIG. 3 presented hereinafter.

With the arrangement proposed:
the support layer, through the mesh nature thereof, is highly expandable; the ink also being expandable, the support layer does not contribute to stiffening the cushioning or cushion,
the support layer, through the porous nature thereof, is not detrimental to the hygrothermal comfort of the cushioning or cushion,
the support layer, in particular when the mesh thereof is sufficiently dense, substantially does not absorb the ink in its thickness, which makes it possible to have reliable electric circuits.

According to a second aspect, the invention proposes a seat provided with such a cushioning or cushion.

BRIEF DESCRIPTION OF THE DRAWINGS

Other particularities and advantages of the invention shall appear in the following description, given in reference to the accompanying figures, wherein.

DETAILED DESCRIPTION

Figure 1:
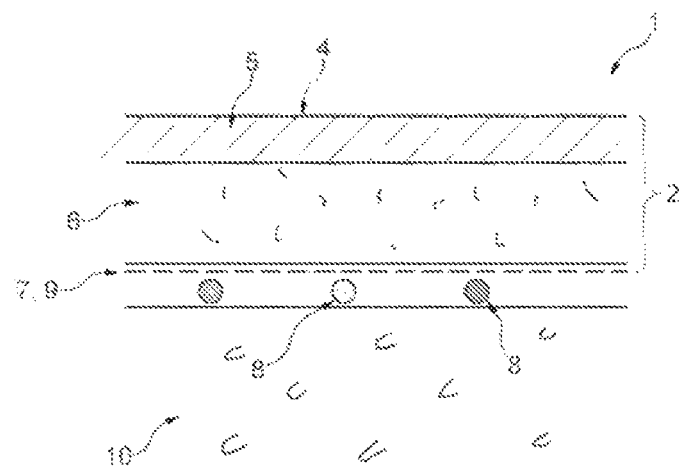
FIG. 1 is a partial cross-section diagrammatical view of a cushioning or cushion according to a first embodiment.
Figure 2:
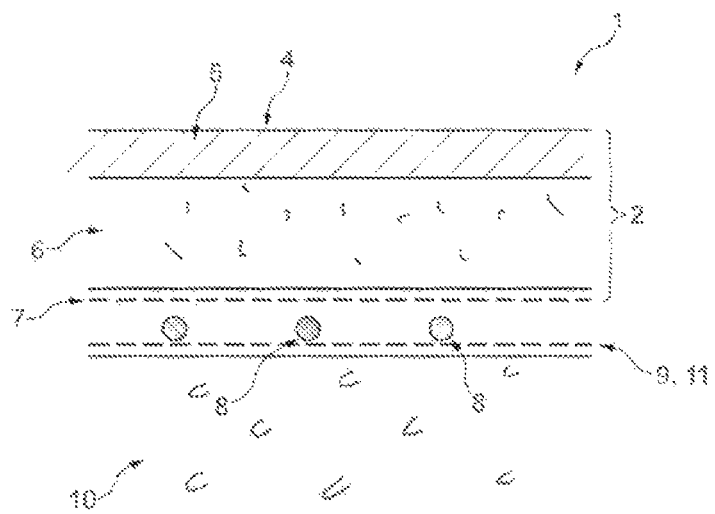
FIG. 2 is a partial cross-section diagrammatical view of a cushioning or cushion according to a second embodiment.
Figure 3:
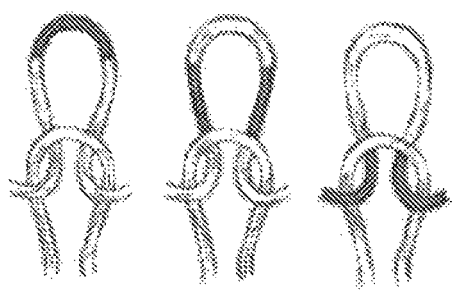
FIG. 3 diagrammatically shows a mesh broken down into three images, the portions highlighted in black represent the head (figure on the left), the two wings or legs (central figure), and the two feet (figure on the right).

In reference to the figures, a cushioning or cushion 1 for a motor vehicle seat is described, the cushioning or cushion comprising consecutively:
a cover 2 for lining the block, the cover being comprised of a plurality of formats associated with each other, in particular by sewing, at least one of the formats being in the form of a complex 4 comprising, associated with each other—in particular by heating with a flame—in sequence:
an outer covering layer 5, for example made from textile or leather,
a middle foam layer 6,
an inner mesh layer 7,
an electric circuit 8 intended to be connected to an electric generator, the circuit being made from conductive ink deposited—in particular via screen printing—on a support layer 9, the circuit extending opposite the complex,
a block 10 of elastically compressible padding, the support layer being formed:
either by the inner layer, as shown in FIG. 1, or by an additional mesh layer 11 interposed between the inner layer and the block, as shown in FIG. 2.

According to an embodiment, the electric circuit 8 is conformed in such a way as to form a heating resistance.

In this embodiment, when the ink is deposited on an additional layer 11, the ink is in particular deposited, as shown in FIG. 2, towards the inner layer 7, in such a way that the electric circuit 8 is as close as possible to an occupant of the cushioning or cushion 1 in order to optimise the heating thereof.

In this embodiment, the thickness of the middle layer 6 is comprised in particular between 1.5 and 5 mm and the density thereof is comprised in particular between 0.025 and 0.045, in such a way as to form a minimised thermal barrier between the electric circuit 8 and an occupant of the cushioning or cushion 1 in order to optimise the heating thereof.

In this embodiment, the electric circuit 8 can in particular be deposited in the central portion of the cover 2.

According to another embodiment, the electric circuit 8 comprises means for coupling, not shown, to a system for detecting the presence of an occupant of the cushioning or cushion 1, in such a way as to carry out the deployment of means of a safety device for example in the form of airbags—in case of an accident only when the cushioning or cushion is occupied according to predefined criteria.

For example, the system for detecting can be arranged to detect an increase in the resistance of the electric circuit 8 under the effect of the weight of a passenger occupying the cushioning or cushion 1, knowing that the ink distends in such a situation, with the effect of increasing the electrical resistance thereof, and then defining whether or not the means of safety have to be activated.

In this embodiment, the thickness of the middle layer 6 is comprised in particular between 1.5 and 5 mm and the density thereof is comprised in particular between 0.025 and 0.045, in such a way as to not hinder the detection of an occupant of the cushioning or cushion 1.

According to an embodiment, when the support layer 9 is formed by the inner layer 7:

it comprises between 6 and 10 columns of yarns/cm and between 5 and 10 rows of yarns/cm, it has a surface density comprised between 25 and 50 g/m², the weight of the yarns is comprised between 40 and 120 dtex.

The support layer 9 then has a mesh that is sufficiently dense that makes it possible for the ink to not be substantially absorbed in the thickness thereof, which makes it possible to have a reliable electric circuit 8.

According to an embodiment, when the support layer 9 is formed by an additional layer 11:

it comprises between 11 and 16 columns of yarns 1 cm and between 15 and 30 rows of yarns/cm, it has a surface density comprised between 175 and 250 g/m², the weight of the yarns is comprised between 40 and 200 dtex.

The support layer 9 has here again a mesh that is sufficiently dense that makes it possible for the ink to not be substantially absorbed in the thickness thereof.

The various values are in this case generally higher than in the preceding case due to the fact that the support layer 9 is not integral with the middle foam layer 6, the support layer then has to have improved mechanical characteristics.

According to various embodiments, the support layer 9 is made from polyester or polyamide.

According to an embodiment, the cover 2 is fitted on the block of padding 10.

According to an embodiment, the cover 2 is overmoulded, at least partially, by the block of padding 10, the block being made from a moulded foam, in particular of polyurethane.

According to an embodiment, the conductive ink comprises a polyurethane matrix in which conductive particles are dispersed, the particles being in particular provided with a thin layer of silver that allows for an optimised electrical contact.

Finally, in a manner not shown, a motor vehicle seat is described comprising a framework and such a cushioning or cushion 1, the cushioning or cushion being mounted as a covering of the framework.

What is claimed is:

1. A cushion for a motor vehicle seat, comprising consecutively:
   a cover for lining a block of padding, the cover having a complex comprising, in sequence:
   an outer covering layer,
   a middle foam layer,
   an inner mesh layer, comprising a network of intertwined yarns of a yarn loop passing through another,
   an electric circuit intended to be connected to an electric generator, the electric circuit being made from conductive ink deposited on a support layer, the electric circuit extending opposite the complex,
   a block of elastically compressible padding,
   wherein the support layer is formed by the inner mesh layer, and
   wherein the inner mesh layer comprises 6-10 columns of yarns/cm, 5-10 rows of yarns/cm, a surface density of from 25 to 50 g/m², and a weight of the yarns of from 40 to 120 dtex.

2. The cushion according to claim 1, wherein the electric circuit is configured to form a heating resistance.

3. The cushion according to claim 1, wherein the electric circuit comprises a coupler for coupling to a system for detecting the presence of an occupant of the cushion, to carry out the deployment of a safety device in case of an accident only when the cushion is occupied according to predefined criteria.

4. The cushion according to claim 1, wherein the cushion further comprises an additional layer on a surface of the inner mesh layer opposite the middle foam layer, wherein the additional layer comprises 11-16 columns of yarns/cm, 15-30 rows of yarns/cm, a surface density of from 175 to 250 g/m², and a weight of the yarns of from 40 to 200 dtex.

5. The cushion according to claim 1, wherein the cover is fitted on the block of padding.

6. The cushion according to claim 1, wherein the cover is overmoulded, at least partially, by the block of padding, the block of padding being made from a moulded foam.

7. The cushion according to claim 1, wherein the conductive ink comprises a polyurethane matrix in which conductive particles are dispersed.

8. The motor vehicle seat comprising a framework and a cushioning according to claim 1, the cushioning being mounted as a covering of the framework.

\* \* \* \* \*